United States Patent Office 3,130,048
Patented Apr. 21, 1964

3,130,048
PRESENSITIZED PRINTING PLATES COMPRISING NAPHTHOQUINONE - 1,2 - DIAZIDE REPRODUCTION LAYERS
Gerhard Fritz, Wiesbaden, and Fritz Uhlig, Wilhelm Neugebauer, and Oskar Süs, Wiesbaden-Biebrich, Germany, assignors, by mesne assignments, to Azoplate Corporation, Murray Hill, N.J., a corporation of New Jersey
No Drawing. Filed Jan. 13, 1960, Ser. No. 2,109
Claims priority, application Germany Jan. 17, 1959
57 Claims. (Cl. 96—33)

This invention relates to printing plates including reproduction layers comprising at least one naphthoquinone-(1,2)-diazide sulfoester containing at least one free hydroxyl group and being derived from hydroxyl compounds of diphenyl, naphthalene or dinaphthyl. These hydroxyl compounds may, if desired, be substituted by halogen and/or alkyl and/or alkoxy and/or carbalkoxy groups. If desired, the esters may be applied in admixture with alkali-soluble resins, or the alkali-soluble resins may be applied as a precoat, and the esters applied thereon as a second coat.

Printing plates are known to the art in which the reproduction layer contains naphthoquinone-(1,2)-diazide sulfoesters as light-sensitive substances.

The light-sensitive esters of the present invention are prepared by esterification of naphthoquinone-(1,2)-diazide-sulfonic acids, generally in the form of their sulfochlorides, with aromatic compounds, e.g. diphenyl, naphthalene or dinaphthyl compounds having at least two hydroxyl groups and including, if desired, other substituents as listed above.

Among the naphthoquinone-(1,2)-diazide-sulfoesters to be used according to the present invention which have proved especially suitable are those derived from naphthoquinone-(1,2)-diazide(2)-sulfonic acid-(5) and naphthoquinone-(1,2)-diazide-(2)-sulfonic acid-(4), but esters of other naphthoquinone-(1,2)-diazide-sulfonic acids, such as Naphthoquinone-(1,2)-diazide-(1)-sulfonic acid-(4),
Naphthoquinone-(1,2)-diazide-(1)-sulfonic acid-(5),
Naphthoquinone-(1,2)-diazide-(1)-sulfonic acid-(6),
Naphthoquinone-(1,2)-diazide-(1)-sulfonic acid-(7),
Naphthoquinone-(1,2)-diazide-(1)-sulfonic acid-(7), and
Naphthoquinone-(1,2)-diazide-(1)-sulfonic acid-(8)

may also be used.

The following compounds are mentioned as examples of aromatic compounds having at least two aromatic nuclei and at least two hydroxyl groups:

2,2'-dihydroxy-phenyl
2,2',4,4'-tetrahydroxyl-diphenyl
2,3-dihydroxy-naphthalene
2,7-dihydroxy-naphthalene
1,3,6-trihydroxy-naphthalene
2,7,2',7'-tetrahydroxy-dinaphthyl-(1,1')

Substitution products of these compounds may also be used. Exemplary substituents are:

Halides, such as fluorine, chlorine, or bromine, of which chlorine is especially suited;
Lower alkyl radicals, such as methyl, ethyl, propyl, or butyl radicals;
Lower alkoxy radicals, such as methoxy, ethoxy, propoxy, or butoxy radicals; and
Carbalkoxy radicals, such as carbmethoxy or carbethoxy radicals.

As examples of such substituted hydroxy compounds having at least two aromatic nuclei, there are mentioned:

4,4'-dihydroxy-2,2'-dimethyl-diphenyl
2,2'-dihydroxy-5,5'-dimethyl-diphenyl
4,4'-dihydroxy-3,3'-dimethyl-diphenyl
3-chloro-4,4'-dihydroxy-diphenyl
3-bromo-4,4'-dihydroxy-diphenyl
3,3'-dichloro-4,4'-dihydroxy-diphenyl
3,3'-dibromo-4,4'-dihydroxy-diphenyl
4,4'-dihydroxy-diphenyl-2,2'-dicarboxylic acid-diethylester
4,4'-dihydroxy-diphenyl-3,3'-dicarboxylic acid-dimethylester For the preparation of the esters, the two components, of which the sulfonic acid usually is applied in the form of the sulfochloride, are generally dissolved in a solvent, such as dioxane or tetrahydrofurane, and then esterified by adding acid-binding agents, such as alkali bicarbonates, alkali carbonates or other weak alkalies or amines, preferably tertiary amines, such as pyridine or N-ethyl-piperidine. In order to avoid formation of a dyestuff only such quantities of the acid-binding agent are added as to render the reaction mixture neutral or weakly alkaline. For separation of the reaction product, it is precipitated by adding water or preferably a dilute acid, e.g. hydrochloric acid, to the reaction mixture, filtered by suction, and dried. In most cases, the sulfoesters thus obtained may be used immediately for the preparation of the light sensitive reproduction layers. They can be further purified by dissolving them in a suitable solvent, e.g. dioxane, and reprecipitating them by adding water to the solution. By choosing suitable quantities of the naphthoquinone-(1,2)-diazide sulfochlorides and the acid-binding agents used, one or more hydroxyl groups may be esterified, as desired.

For the preparation of the reproduction layers, the naphthoquinone-(1,2)-diazide-sulfoesters containing hydroxyl groups are dissolved in organic solvents, such as ethyleneglycol monomethylether, ethyleneglycol monoethylether, dioxane, dimethyl formamide, or aliphatic ketones, and then coated in known manner onto suitable supports, such as metal plates or foils consisting of aluminum, zinc or copper, or plastic films, or base materials consisting of several metals, paper or glass. On the reproduction material thus obtained, copies are produced by exposing the material to light through a master and then transforming it into printing plates by developing, preferably with dilute alkalies, preferably alkaline-reacting salts, such as trisodium phosphate or disodium phosphate. Alkali-soluble resins may also be incorporated into the reproduction layers, which, in general, produces improved homogeneity in the coating and better adhesion to the support. Such alkali-soluble resins are natural resins, such as shellac or colophony, and synthetic resins, such as copolymers of styrene and maleic anhydride, and especially low molecular condensation products of phenols with formaldehyde, the so-called "novolaks."

The amount of the alkali soluble resin to be added to the light sensitive diazo esters described above may vary widely. For the production of planographic printing plates lower concentrations of resins are used, i.e. from about 0.1 to about 1.0 part, preferably 0.3 to 0.8 part by weight of resin to 1.0 part by weight of ester. If plates are required which can withstand the acid etching agents used in etching machines, for example for the preparation of half-tone blocks, higher resin concentrations are used, i.e. from about 1.0 to about 6.0 parts, preferably from about 2.0 to about 4.0 parts by weight of the resin to 1.0 part of the above diazo esters.

The above described esters may also be used in admixture with each other or with other light sensitive substances.

Printing plates prepared by means of the above described naphthoquinone-(1,2)-diazide-(2)-sulfoesters are superior to printing plates prepared by means of the esters hitherto used in that they are more easily developed and have improved thermal stability, which results in an improvement of the shelf life of the unexposed printing plates, even under adverse conditions.

The formulae of the compounds referred to in the examples below are as follows:

FORMULA 1

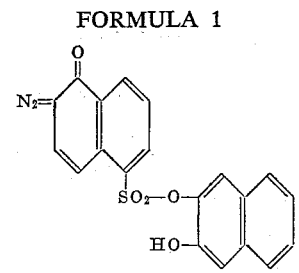

FORMULA 2

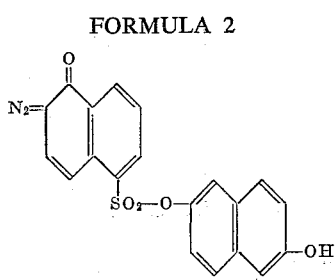

FORMULA 3

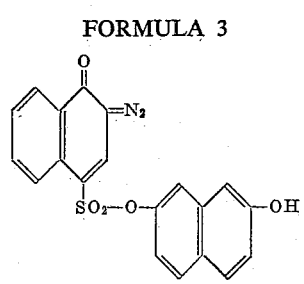

FORMULA 4

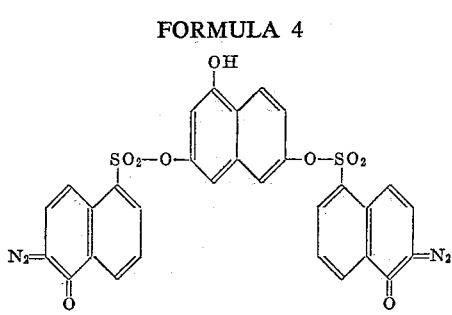

FORMULA 5

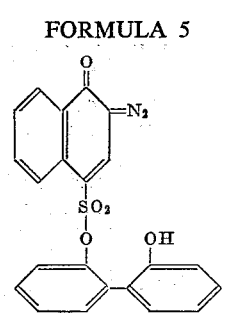

FORMULA 6

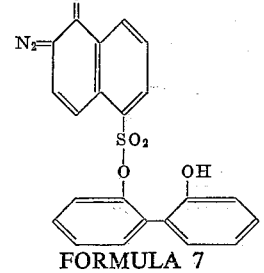

FORMULA 7

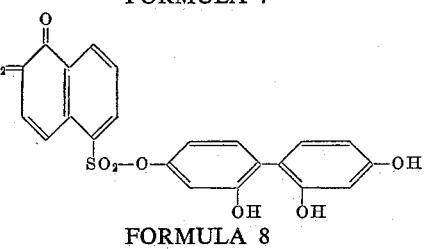

FORMULA 8

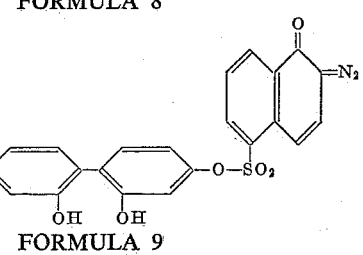

FORMULA 9

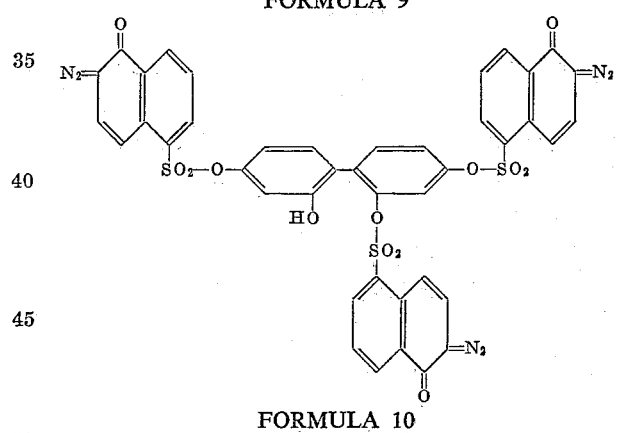

FORMULA 10

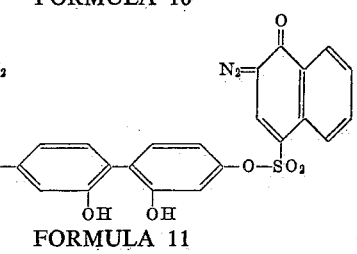

FORMULA 11

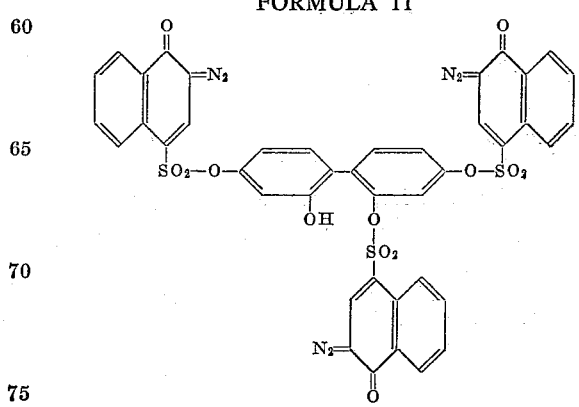

FORMULA 12

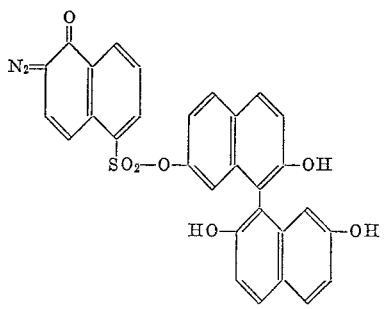

FORMULA 13

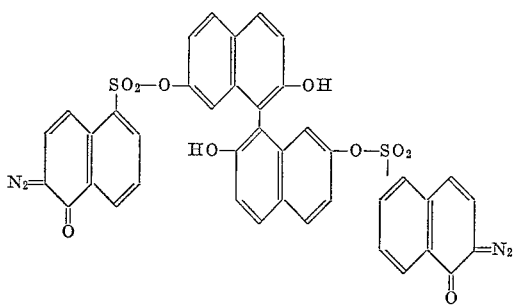

The invention will be further illustrated by reference to the following specific examples:

*Example I*

1.5 parts by weight of the compound corresponding to Formula 1 are dissolved in 100 parts by volume of a 4:1 mixture of ethyleneglycol monomethylether and butyl-acetate. Further, the solution contains 5.6 parts by weight of a phenol formaldehyde novolak ("Alnovol"). A mechanically roughened aluminium foil is placed on a rotating disc and then coated with the above solution. Thereafter, the foil is dried first with a current of warm air and subsequently for two minutes at 100° C. The sensitized foil is then exposed under a master for about one minute, using, e.g., a closed carbon arc lamp of 18 amp. at a distance of about 70 cm. For development, the exposed side of the foil is treated with a cotton pad soaked in a 5 percent trisodium phosphate solution containing also about 5 percent of ethyleneglycol monomethylether. By this treatment, the light sensitive layer is removed from the support in the areas struck by light during exposure. An image corresponding to the master used, becomes visible against a metallic background. The developed foil is rinsed with water, wiped over with an about one percent phosphoric acid solution, and then inked with greasy ink. The printing plate thus obtained may be used for printing in a customary printing apparatus.

The diazo compound corresponding to Formula 1 is prepared as follows:

Sixteen parts by weight of 2,3-dihydroxy-naphthalene and 27 parts by weight of naphthoquinone-(1,2)-diazide-(2)-sulfonic acid chloride-(5) are dissolved in 200 parts by volume of dioxane. At room temperature and while agitating, a saturated sodium bicarbonate solution is slowly added until the reaction mixture has become weakly alkaline (pH value=about 8). The mixture is then agitated for another 30 minutes. The 2-(naphthoquinone-(1,2)-diazide-(2)-sulfonyloxy-(5))-hydroxy-(3) - naphthalene precipitates in the form of a light-brown substance. For complete separation, the reaction mixture is poured into 1000 parts by volume of ice water, which was previously acidified by the addition of 40 parts by volume of dilute hydrochloric acid (1:1). The precipitating mono-ester is filtered by suction, dissolved in dioxane, and then reprecipitated by adding water to the solution. It is a yellow crystalline substance which melts at 243–248° C. The compound is readily soluble in acetone, ethyleneglycol monomethylether, and dioxane, but only difficultly soluble in ethanol.

*Example II*

A paper foil suitable for making printing plates, e.g. a paper foil manufactured in accordance with the disclosure of U.S. Patent No. 2,534,588, is coated with a two percent solution in dioxane of the compound corresponding to Formula 2, dried by means of a current of warm air, and then exposed under a master for about one minute under an arc lamp. For development, the paper foil is treated with a 5 percent disodium phosphate solution whereby the paper support base material is exposed in the light-struck areas. After inking with greasy ink, a printing plate corresponding to the master used is obtained.

The diazo compound corresponding to Formula 2 is prepared as follows:

Sixteen parts by weight of 2,7-dihydroxy-naphthalene and 27 parts by weight of naphthoquinone-(1,2)-diazide-(2)-sulfonic acid chloride-(5) are dissolved in 200 parts by volume of dioxane. While agitating and at room temperature, a saturated sodium bicarbonate solution is slowly added until the reaction mixture has become weakly alkaline (pH=about 8). The reaction mixture is then agitated for another 30 minutes. For complete separation of the mono-ester, which first precipitates as a yellow-brown semi-solid compound, the reaction mixture is poured into 1000 parts by volume of ice water, which was previously acidified by the addition of 40 parts by volume of dilute hydrochloric acid (1:1). The raw product is purified by dissolving it in dimethyl formamide and then reprecipitating by adding water to the solution. The purified 2-(naphtho-quinone-(1,2)-diazide-(2)-sulfonyl-oxyl(5))-hydroxy-(7)-naphthalene is a yellow crystalline substance which begins to melt at about 350° C. while slowly turning dark. The compound is soluble in dioxane or ethylene glycol monomethylether, but difficultly soluble in acetone or ethanol.

*Example III*

Following the procedure described in Example II, in connection with the compound corresponding to Formula 2, printing plates of equal quality can be prepared using the compound corresponding to Formula 3.

The diazo compound corresponding to Formula 3 is prepared as follows:

Sixteen parts by weight of 2,7-dihydroxy-naphthalene and 27 parts by weight of naphthoquinone-(1,2)-diazide-(2)-sulfonic acid chloride-(4) are dissolved in 300 parts by volume of dioxane. While agitating and at room temperature, sufficient saturated sodium bicarbonate solution is added to render the solution weakly alkaline. For complete reaction, agitation is continued for about 30 minutes. The 2 - (naphthoquinone - (1,2) - diazide - (2) - sulfonyl-oxy-(4))-hydroxy-(7)-naphthalene which forms, precipitates as a brown oil. It is added to 1000 parts by volume of ice water, which was previously acidified by adding dilute hydrochloric acid, and digested, whereby it becomes solid. The precipitated mono-ester is purified by first dissolving it in ethyleneglycol monomethylether and reprecipitating it by adding water to the solution. It is a light-brown crystalline powder which melts at about 350° C. while turning dark. The compound is soluble in dioxane, acetone, methyl ethyl ketone, and ethyleneglycol monomethylether.

*Example IV*

1.5 parts by weight of the compound corresponding to Formula 4 are dissolved in 100 parts by volume of ethyleneglycol monomethyl ether and this solution is used for coating a mechanically roughened aluminum foil mounted on a rotating disc. The foil is then dried, first by means of a current of warm air and then for about two minutes at a temperature of 100° C. The sensitized foil is exposed under a master for about one minute using, e.g. a closed carbon arc lamp of 18 amp., at a distance of 70 cm. Upon treating the exposed side of the foil with a cotton pad soaked in a 5 percent trisodium phosphate solution, an image corresponding to the master used becomes visible against a metallic background. The image side of the foil is rinsed with water, wiped over with an about one percent solution of phosphoric acid, and inked with greasy ink. The printing plate thus obtained may be set up in a printing apparatus and used for printing.

The compound corresponding to Formula 4 is prepared as follows:

Fifty-four parts by weight of naphthoquinone-(1,2)-diazide-(2)-sulfonic acid chloride-(5) and 17.6 parts by weight of 1,3,6-trihydroxy-naphthalene are dissolved in 300 parts by volume of dioxane. While agitating and at room temperature, as much of a saturated sodium bicarbonate solution is added as to render the solution neutral. The crude 3,6-bis-(naphthoquinone-(1,2)-diazide-(2)sulfonyloxy-(5))-hydroxy-(1) - naphthalene precipitates as a reddish-brown oil which, upon digestion in ice water, solidifies to form a solid reddish-brown substance. The compound is purified by dissolving it in dioxane and reprecipitating by adding water to the solution. The purified 3,6-bis-(naphthoquinine-(1,2)-diazide-(2)-sulfonyloxy-(5))-hydroxy-(1)-naphthalene dissolves in the same solvents as does the compound corresponding to Formula 2. It melts at about 350° C. while slowly charring.

Equally good results are obtained when using the compound corresponding to Formula 13 instead of the compound corresponding to Formula 4.

The compound corresponding to Formula 13 is prepared as follows:

3.2 parts by weight of 2,7,2',7'-tetrahydroxy-dinaphthyl-(1,1') and 5.4 parts by weight of naphthoquinone-(1,2)-diazide-(2)-sulfonic acid chloride-(5) are dissolved in 100 parts by volume of dioxane and while agitating and at room temperature, sufficient saturated sodium bicarbonate solution is added to render the reaction mixture neutral. The crude 7,7'-bis-(naphthoquinone-(1,2)-diazide - (2) - sulfonyloxy - (5)) - dihydroxy - (2,2') - dinaphthyl-(1,1') precipitates as a light-brown semi-solid compound. The reaction mixture is poured into 1000 parts by volume of water, which was previously acidified by means of dilute hydrochloric acid. The reaction product solidifies to form a yellow-brown substance which is dissolved in ethyleneglycol monomethylether and then reprecipitated by adding water to the solution. A crystalline compound is obtained which melts at about 350° C., while slowly turning dark. It is soluble in dioxane, glacial acetic acid, and ethyleneglycol monomethylether.

*Example V*

A solution consisting of 1.5 parts by weight of the compound corresponding to Formula 5 dissolved in 100 parts by volume of ethyleneglycol monomethylether is, following the procedure of Example I, coated onto a mechanically roughened aluminum foil and dried. The thus sensitized foil is exposed under a master and then developed with a 0.25 percent trisodium phosphate solution, thus removing the exposed areas of the light sensitive layer. After treating the developed foil with one percent phosphoric acid and inking with greasy ink, it may be used as a printing plate. Printing plates are obtained which correspond to the master used.

The compound corresponding to Formula 5 is prepared as follows:

13.3 parts by weight of 2,2'-dihydroxy-diphenyl and 19.6 parts by weight of naphthoquinone-(1,2)-diazide-(2)-sulfonic acid chloride-(4) are dissolved in 200 parts by volume of dioxane. While agitating and at room temperature, as much of a 10 percent sodium bicarbonate solution is slowly added as to render the dioxane solution neutral; about 150 parts by volume of the sodium bicarbonate solution are required. Agitation is continued for another hour. The 2-(naphthoquinone-(1,2)-diazide-(2)-sulfonyloxy-(4))-hydroxy-(2')-diphenyl precipitates in the form of a yellow-brown oil. For further precipitation, about 80 parts by volume of water are added. The crude reaction product is repeatedly decanted with water, whereby the oil solidifies, and is then recrystallized from a dioxane/methanol mixture. The compound thus obtained is a golden-yellow finely crystalline substance which melts at 115° C. with decomposition. The mono-ester is readily soluble in ethyleneglycol mono-methylether, but insoluble in alkalies and methanol.

A printing plate from which prints of the same quality can be made can also be prepared when using the compound corresponding to Formula 6. 1.5 parts by weight of the compound corresponding to Formula 6 and 3.5 parts by weight of a phenolformaldehyde novolak, e.g. the product mentioned in Example I, are dissolved in 100 parts by volume of ethyleneglycol monomethylether and the solution is coated in known manner onto a mechanically roughened aluminum foil and dried. The light sensitive layer is then exposed under a master. For development of the latent image thus produced, a 5 percent trisodium phosphate solution is used containing also about 15 percent of ethyleneglycol monomethylether. By this treatment, the exposed parts of the light sensitive layer are removed. After development, the foil is shortly wiped over with a 1 percent phosphoric acid solution and then inked with greasy ink. Printing plates are obtained in this way which correspond to the master used.

The compound corresponding to Formula 6 is prepared as follows:

13.3 parts by weight of 2,2'-dihydroxy-diphenyl and 19.6 parts by weight of naphthoquinone-(1,2)-diazide-(2)-sulfonic acid chloride-(5) are dissolved in 200 parts by volume of dioxane. At room temperature and while agitating, about 150 parts by volume of a 10 percent sodium bicarbonate solution are added to render the solution neutral. Agitation is continued for about one hour. The 2 - (naphthoquinone - (1,2) - diazide - (2) - sulfonyloxy-(5))-hydroxy-(2')-diphenyl precipitates as a yellow-brown oil. To complete the precipitation, about 80 parts by volume of water are added. The crude reaction product is repeatedly decanted with water so that it becomes solid. After recrystallization from a mixture of ethyleneglycol monomethylether and methanol, the 2-(naphthoquinone - (1,2) - diazide - (2) - sulfonyloxy - (5)) - hydroxy-(2')-diphenyl is obtained in the form of a finely crystalline yellow compound which melts at 150° C. with decomposition. The compound is soluble in ethyleneglycol monomethylether but insoluble in alkalies and methanol.

*Example VI*

A solution consisting of 1.5 parts by weight of the compound corresponding to Formula 7 in 100 parts by volume of ethyleneglycol monomethylether is coated onto a mechanically roughened aluminum foil and dried. The thus sensitized foil is exposed under a master and then developed by means of a 0.5 percent trisodium phosphate solution. By this treatment, the exposed areas of the light sensitive layer are removed and the support is bared. In order to increase the hydrophilic properties of the support in the exposed areas, the developed foil is wiped over with a 1 percent phosphoric acid solution. After inking with greasy ink, it may be used as a printing plate which corresponds to the master used.

The compound corresponding to Formula 7 is prepared as follows:

15.4 parts by weight of 2,4,2',4'-tetrahydroxy-diphenyl and 19.6 parts by weight of naphthoquinone-(1,2)-diazide-(2)-sulfonic acid chloride-(5) are dissolved in 200 parts by volume of dioxane. While agitating, sufficient ten percent sodium bicarbonate solution is added until the reaction mixture becomes neutral. The reaction is completed by agitating for another hour. The crude 4-(naphthoquinone - (1,2) - diazide - (2) - sulfonyloxy - (5))- trihydroxy-(2,2',4')-diphenyl precipitates as a solid yellow substance. The crude product may be purified by dissolving it in ethyleneglycol monomethylether, reprecipitating it by adding a water/methanol mixture, and finally digesting it with 200 parts by volume of methanol. The purified substance begins to melt at 180° C. while slowly darkening. It is readily soluble in ethyleneglycol monomethylether, but insoluble in alkalies and methanol.

*Example VII*

A solution consisting of 1.5 parts by weight of the compound corresponding to Formula 8 dissolved in 100 parts by volume of ethyleneglycol monomethylether is, following the procedure of Example I, coated onto a roughened aluminum foil, dried, exposed under a master, and developed with a 0.5–2 percent trisodium phosphate solution, thus baring the support in the exposed areas. After the foil has been washed with water and treated with 1 percent phosphoric acid, it may be inked with greasy ink and used as a printing plate. Thus, a printing plate corresponding to the master used and, from the printing plate, copies corresponding to that master may be obtained.

The diazo compound corresponding to Formula 8 is prepared as follows:

6.6 parts by weight of 2,4,2',4'-tetrahydroxydiphenyl and 18.0 parts by weight of naphthoquinone-(1,2)-diazide-(2)-sulfonic acid chloride-(5) are dissolved in 180 parts by volume of dioxane. While agitating, a 5 percent sodium carbonate solution is added until the reaction mixture becomes neutral. The reaction is completed by agitating for another hour. The bis-ester precipitates as a yellow-brown solid substance. The crude product may be purified by recrystallization from a glacial acetic acid/methanol mixture and subsequent digestion in about 200 parts by volume of methanol. The purified 4,4'-di-(naphthoquinone-(1,2)-diazide - (2)-sulfonyloxy-(5))-dihydroxy-(2,2')-diphenyl is obtained as a finely crystalline yellow substance which begins to melt at about 350° C. while slowly turning dark. The bis-ester is readily soluble in ethyleneglycol monomethylether and insoluble in alkalies, methanol and ethanol.

Alternatively, a printing plate may be prepared using the compound corresponding to Formula 8, by the following procedure:

Four parts by weight of the compound corresponding to Formula 8, 3 parts by weight of a phenolformaldehyde novolak, e.g. the product mentioned in Example I, and 0.5 part by weight of methyl violet are dissolved in 92.5 parts by volume of ethyleneglycol monomethylether and this solution is used for coating a lithographic bimetallic plate consisting of copper and aluminum. The sensitized plate is exposed under a master for about five minutes to the light of a closed carbon arc lamp of 18 amp. at a distance of about 70 cm. Subsequently, the plate is developed by means of a 5 percent trisodium phosphate solution containing about 15 percent of ethyleneglycol monomethylether, thus baring the metallic support in the exposed areas. The developed plate is etched for about 1½ minutes with a solution consisting of 160 parts by weight of $Fe(NO_3)_3 \cdot 9H_2O$ dissolved in 100 parts by volume of water. Printing plates corresponding to the master used are obtained.

*Example VIII*

1.5 parts by weight of the compound corresponding to Formula 9 and 3.5 parts by weight of a phenolformaldehyde novolak, e.g. the product mentioned in Example I, are dissolved in 100 parts by volume of ethyleneglycol monomethylether. This solution is coated onto a mechanically roughened aluminum foil mounted on a rotating plate. The coated foil is dried first by means of a current of warm air and then, for complete removal of the solvent, for about two minutes at 100° C. The thus sensitized foil is exposed under a master for about one minute to the light of a closed carbon arc lamp of 18 amp. at a distance of about 70 cm. For development of the image, the exposed side of the foil is treated with a cotton pad soaked in a 5 percent trisodium phosphate solution containing also about 5 percent of ethyleneglycol monomethylether. By this treatment, the light struck areas of the reproduction layer are removed and an image, corresponding to the master used, in a bright yellow color, becomes visible against a metallic background. The image side of the foil is rinsed with water, treated with 0.5–1 percent phosphoric acid, and finally inked with greasy ink. The printing plate thus obtained may be used for printing in a conventional printing apparatus.

The diazo compound corresponding to Formula 9 is prepared as follows:

6.6 parts by weight of 2,4,2',4'-tetrahydroxydiphenyl and 17.0 parts by weight of naphthoquinone-(1,2)-diazide-(2)-sulfonic acid chloride-(5) are dissolved in 200 parts by volume of dioxane. While agitating and at room temperature, about 200 parts by volume of a 5 percent sodium carbonate solution are added until the solution has become weakly alkaline (pH=about 8). Agitation is continued for about one hour to complete the reaction. The tri-ester thus formed precipitates as a yellow brown oil which is decanted from the reaction fluid and digested with 300 parts by volume of water. The 2,4,4'-tri-(naphthoquinone - (1,2) - diazide-(2)-sulfonyloxy-(5))-hydroxy-(2')-diphenyl which now has become solid is recrystallized from glacial acetic acid and forms a golden-yellow finely crystalline substance which begins to melt at 350° C. while slowly charring. For removal of the glacial acetic acid, the compound is washed with about 200 parts by volume of methanol. It is easily soluble in ethyleneglycol monomethylether and insoluble in alkalies, methanol and ethanol.

*Example IX*

A commercially available paper base, manufactured in accordance with U.S. Patent No. 2,534,588, and suitable for the production of printing plates, is coated on its layer side, i.e. the side which has been pretreated to carry the light sensitive layer, with a 1.5 percent solution in dioxane of the compound corresponding to Formula 10, dried by means of warm air and subsequently exposed under a master for about one minute, to the light of an 18 amp. arc lamp. The image is then developed with a 1 percent aqueous soltuion of diethanol amine, thus removing the light struck areas of the reproduction layer and baring the paper base. Alternatively, the developer solution may be applied simultaneously with the greasy ink, e.g. as an emulsion, because no intermediate treatment of the developed foil with dilute acid is required. Paper printing plates corresponding to the master used are thus produced.

The sulfonic acid ester corresponding to Formula 10 is prepared as follows:

6.6 parts by weight of 2,4,2',4'-tetrahydroxy-diphenyl and 16.5 parts by weight of naphthoquinone-(1,2)-diazide-(2)-sulfonic acid chloride-(4) are dissolved in 150 parts by volume of dioxane. While agitating and at room temperature, sufficient 10 percent sodium bicarbonate solution is added to render the reaction mixture neutral. It is advisable to avoid any excess of sodium bicarbonate as coupling very readily occurs. The neutral reaction mixture is agitated for another hour. The bis-ester precipitates in the form of a semi-solid substance which is decanted from the reaction mixture and digested with about 300 parts by volume of water. The reaction product is dissolved in ethyleneglycol monomethylether, methanol is added to the solution, and the reprecipitated reaction product is then washed with about 200 parts by volume of methanol. The purified 4,4'-di-(naphthoquinone-(1,2)-diazide-(2)-sulfonyloxy-(4))-dihydroxy-(2,2')-diphenyl begins to melt at about 350° C. while slowly charring. It is readily soluble in ethyleneglycol monomethylether and insoluble in alkalies, methanol, and ethanol.

Example X

Following the procedure of Example 8, a superficially roughened aluminum foil is coated with a solution of the compound corresponding to Formula 11 in methyl isobutyl ketone, dried, and exposed under a master. For development of the image, a 1–2 percent trisodium phosphate solution is used. Printing plates which correspond to the master used are thus obtained.

The diazo compound corresponding to Formula 11 is prepared as follows:

6.6 parts by weight of 2,4,2',4'-tetrahydroxy-diphenyl and 25.2 parts by weight of naphthoquinone-(1,2)-diazide-(2)-sulfonic acid chloride-(4) are dissolved in 200 parts by volume of dioxane. While agitating and at room temperature, about 150 parts by volume of a 10 percent sodium bicarbonate solution are slowly added to render the reaction mixture neutral. It is advisable to avoid an excess of sodium bicarbonate because, in this case, coupling may occur. Agitation is continued for about one hour. The tri-ester thus formed precipitates in the form of a semi-solid substance which is decanted from the reaction mixture and is digested with about 300 parts by volume of water. The reaction product is then dissolved in ethyleneglycol monomethylether, methanol is added to the solution, and the precipitating reaction product is washed with about 200 parts by volume of methanol. A yellow-red substance is obtained which begins to melt at about 350° C. while slowly turning dark. The 2,4,4'-tri-(naphthoquinone-(1,2)-diazide-(2)-sulfonyloxy-(4))-hydroxy-(2')-diphenyl is readily soluble in ethyleneglycol monomethylether and insoluble in alkalies, methanol or ethanol.

Example XI

For the preparation of a printing plate using the compound corresponding to Formula 12, the process described in Example V is followed as regards coating, exposure and development. Printing plates of about the same quality are obtained.

The compound corresponding to Formula 12 is prepared as follows:

3.2 parts by weight of 2,7,2',7'-tetrahydroxydinaphthyl-(1,1') and 2.7 parts by weight of naphthoquinone-(1,2)-diazide-(2)-sulfonic acid chloride-(5) are dissolved in 100 parts by volume of dioxane. While agitating and at room temperature, sufficient saturated sodium bicarbonate solution is slowly added to render the reaction mixture neutral. The crude mono-ester 7-naphthoquinone-(1,2)-diazide-(2)-sulfonyloxy-(5)-trihydroxy-(2,2',7')-dinaphthyl-(1,1') precipitates as a light brown semi-solid compound. The reaction mixture is poured into 1000 parts by volume of ice water, which was previously acidified by means of dilute hydrochloric acid. The reaction product solidifies to form a yellow-brown substance which is purified by dissolving it in ethyleneglycol monomethylether and then reprecipitating it by adding water to the solution. A crystalline compound is obtained which begins to melt at about 350° C. while charring. It is soluble in dioxane, glacial acetic acid and ethyleneglycol monomethylether.

Example XII 2.5 parts by weight of 2-[naphthoquinone-(1,2)-diazide-(2)-sulfonyloxy-(5)]hydroxy-(3)-naphthalene corresponding to Formula 1 and 7.5 parts by weight of a light colored m-cresol-formaldehyde-resin novolak having a softening point of 108–118° C. are dissolved in 80 parts by volume of ethylene glycol monomethylether and 20 parts by volume of butyl acetate. 0.3 part by weight of sesame oil and 0.5 part by weight of "Methyl Violet BB" are added, the solution is filtered and then coated onto a polished zinc plate. The layer is then dried by means of warm air. For the preparation of a printing plate the layer side of the zinc plate is exposed through a diapositive. The exposed layer which now carries the image is treated with a cotton pad soaked with 2.5% approx. trisodium phosphate solution, containing also 10–15% (by volume) of ethylene glycol monomethylether. The parts of the layer which were affected by light during the exposure are hereby removed from the surface of the zinc plate and an image corresponding to the master used remains. After rinsing with water the plate is placed, coated side downwards, on an earthenware trough, containing rotating finned wheels which project dilute (7–8%) nitric acid against the plate by centrifugal action. Etching is performed either by the usual process in several steps or according to the one-step process. Without heating the zinc plate before etching, a printing plate is obtained which is especially suitable for book and illustration printing.

Example XIII

In 100 parts by volume of ethyleneglycol monomethylether there are dissolved 2 parts by weight of 2-[naphthoquinone-(1,2)-diazide-(2)-sulfonyloxy - (4)] - hydroxy-(2')-diphenyl corresponding to formula 5 and 6 parts by weight of a light colored m-cresol-formaldehyde resin novolak having the qualities described in Example XII. 0.3 part by weight of castor oil and 0.5 part by weight of rosaniline-hydrochloride are added to the solution, which is then filtered and coated onto a polished copper plate. After exposure under a photographic negative the layer is treated with a cotton pad soaked with 2.5% (approx.) trisodium phosphate solution, also containing 10–15% (by volume) of ethyleneglycol monomethylether; thereby the light-affected parts of the layer are removed. The copper plate carrying parts of the layer corresponding to the master is now etched at 20–22° C. with an iron chloride solution of 40° Bé.

The light sensitive solution is also suitable for directly coating rotating copper cylinders, a spray nozzle being used.

It will be obvious to those skilled in the art that many modifications may be made within the scope of the present invention without departing from the spirit thereof, and the invention includes all such modifications.

What is claimed is:

1. A compound having the formula

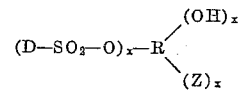

in which

D is a naphthoquinone-1,2-diozide group, and
R is selected from the group consisting of diphenyl, naphthyl, and dinaphthyl radicals, the substituent
Z being selected from the group consisting of hydrogen, alkyl, alkoxy, carbalkoxy, halogen, and quinone diazide sulfonyloxy groups, and
$x$ represents an interger from 1 to 3.

2. A compound having the formula

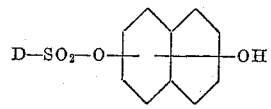

in which D is naphthoquinone-1,2-diazide group.

3. A compound having the formula

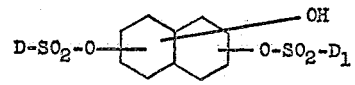

in which D and $D_1$ are naphthoquinone-1,2-diazide groups.

4. A compound having the formula

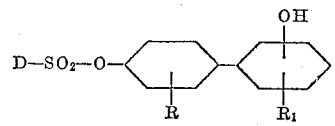

in which D is a naphthoquinone-1,2-diazide group, and R and R₁ are selected from the group consisting of hydrogen and hydroxyl.

5. A compound having the formula

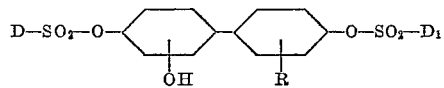

in which D and D₁ are naphthoquinone-1,2-diazide groups and R is selected from the group consisting of hydroxyl and naphthoquinone-1,2-diazide sulfonic acid ester groups.

6. A compound having the formula

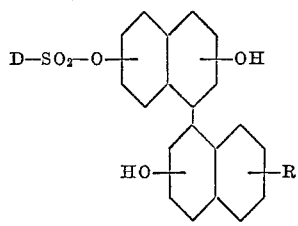

in which D is a naphthoquinone-1,2-diazide group and R is selected from the group consisting of hydroxyl and naphthoquinone-1,2-diazide sulfonic acid ester groups.

7. A compound having the formula

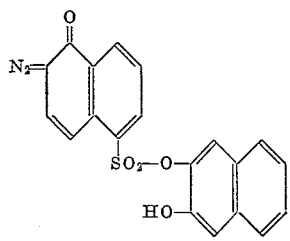

8. A compound having the formula

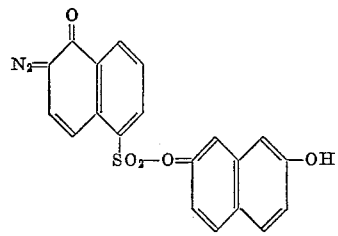

9. A compound having the formula

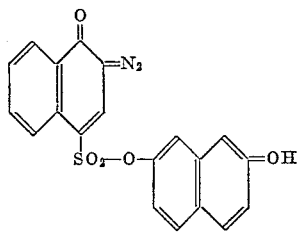

10. A compound having the formula

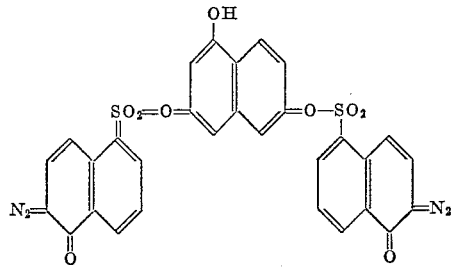

11. A compound having the formula

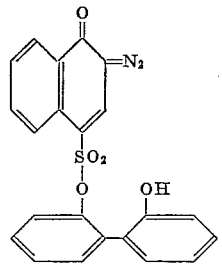

12. A compound having the formula

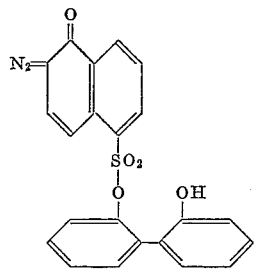

13. A compound having the formula

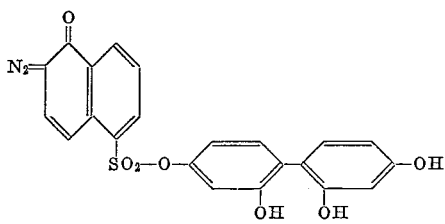

14. A compound having the formula

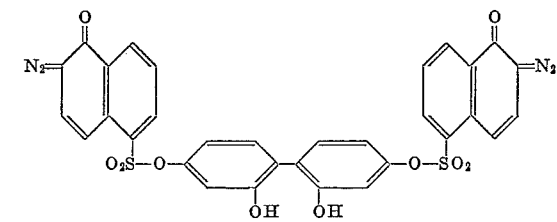

15. A compound having the formula

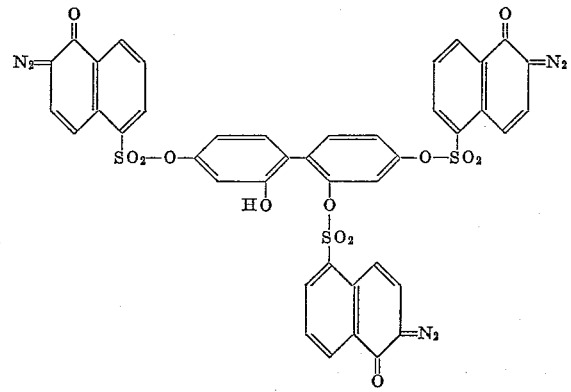

16. A compound having the formula

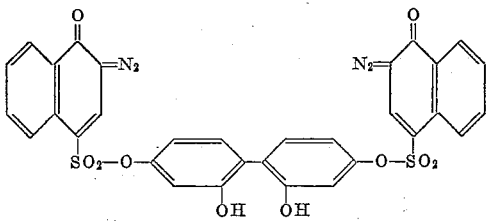

17. A compound having the formula

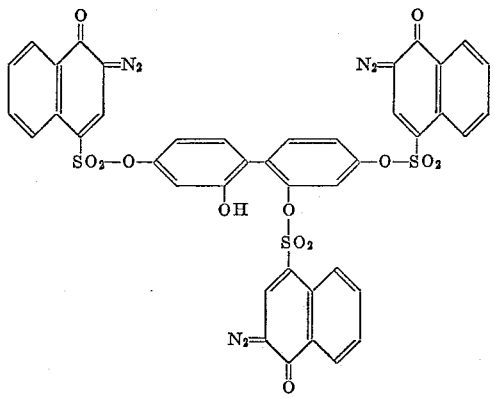

18. A compound having the formula

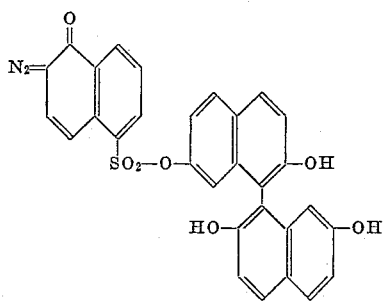

19. A compound having the formula

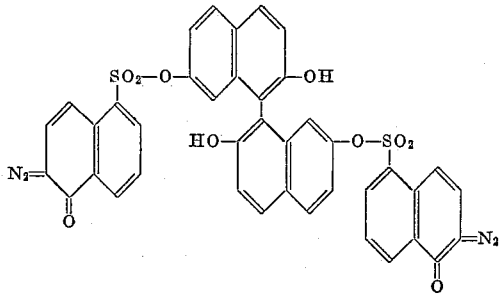

20. A presensitized printing plate comprising a base material having a coating thereon, the coating comprising a compound having the formula

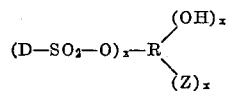

in which
D is a naphthoquinone-1,2-diazide group, and
R is selected from the group consisting of diphenyl, naphthyl, and dinaphthyl radicals, the substituent Z being selected from the group consisting of hydrogen, alkyl, alkoxy, carbalkoxy, halogen, and naphthoquinone-1,2-diazide sulfonyloxy groups, and
$x$ represents an integer from 1 to 3.

21. A presensitized printing plate comprising a base material having a coating thereon, the coating comprising a compound having the formula

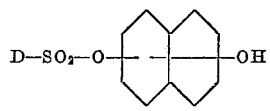

in which D is a naphthoquinone-1,2-diazide group.

22. A presensitized printing plate comprising a base material having a coating thereon, the coating comprising a compound having the formula

in which D and $D_1$ are naphthoquinone-1,2-diazide groups.

23. A presensitized printing plate comprising a base material having a coating thereon, the coating comprising a compound having the formula

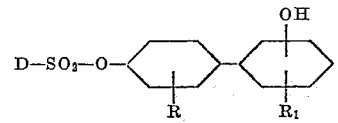

in which D is a naphthoquinone-1,2-diazide group, and R and $R_1$ are selected from the group consisting of hydrogen and hydroxyl.

24. A presensitized printing plate comprising a base material having a coating thereon, the coating comprising a compound having the formula

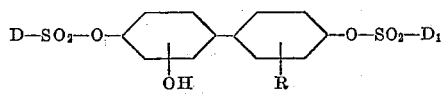

in which D and $D_1$ are naphthoquinone-1,2-diazide groups and R is selected from the group consisting of hydroxyl and naphthoquinone-1,2-diazide sulfonic acid ester groups.

25. A presensitized printing plate comprising a base material having a coating thereon, the coating comprising a compound having the formula

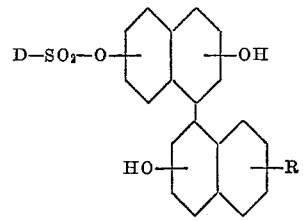

in which D is a naphthoquinone-1,2-diazide group and R is selected from the group consisting of hydroxyl and naphthoquinone-1,2-diazide sulfonic acid ester groups.

26. A presensitized printing plate comprising a base material having a coating thereon, the coating comprising a compound having the formula

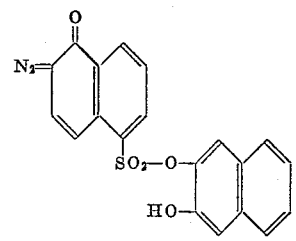

27. A presensitized printing plate comprising a base material having a coating thereon, the coating comprising a compound having the formula

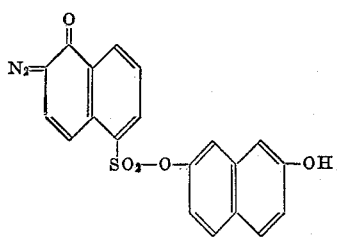

28. A presensitized printing plate comprising a base material having a coating thereon, the coating comprising a compound having the formula

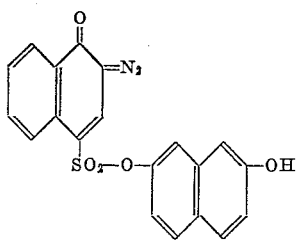

29. A presensitized printing plate comprising a base material having a coating thereon, the coating comprising a compound having the formula

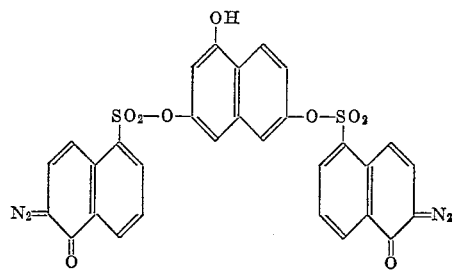

30. A presensitized printing plate comprising a base material having a coating thereon, the coating comprising a compound having the formula

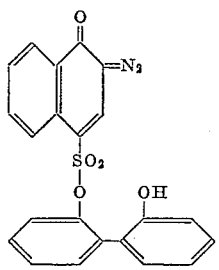

31. A presensitized printing plate comprising a base material having a coating thereon, the coating comprising a compound having the formula

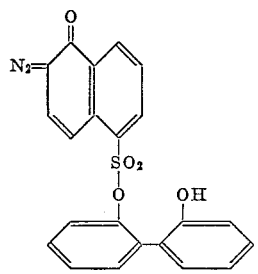

32. A presensitized printing plate comprising a base material having a coating thereon, the coating comprising a compound having the formula

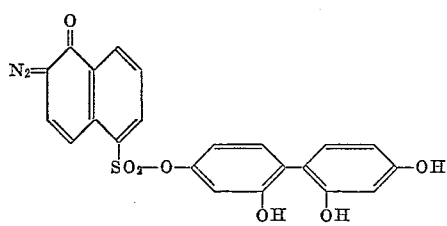

33. A presensitized printing plate comprising a base material having a coating thereon, the coating comprising a compound having the formula

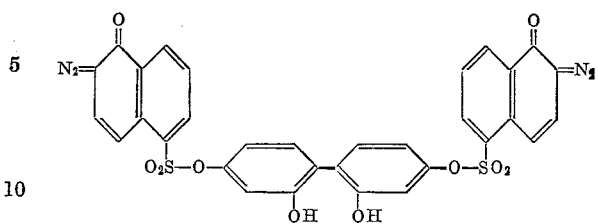

34. A presensitized printing plate comprising a base material having a coating thereon, the coating comprising a compound having the formula

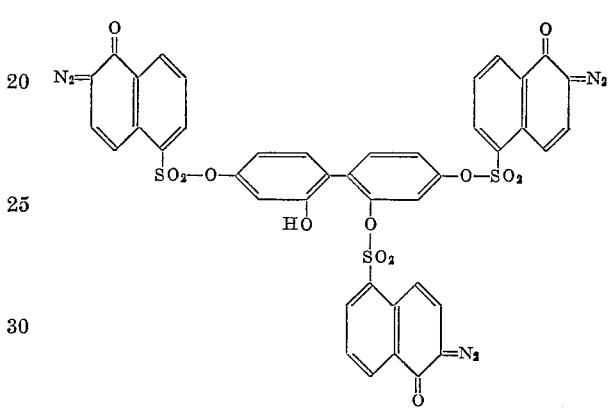

35. A presensitized printing plate comprising a base material having a coating thereon, the coating comprising a compound having the formula

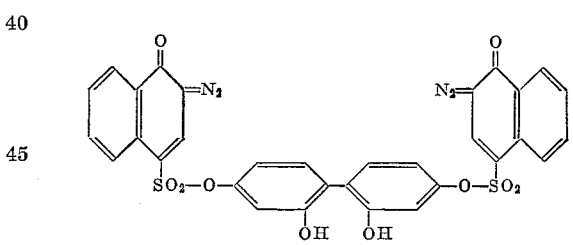

36. A presensitized printing plate comprising a base material having a coating thereon, the coating comprising a compound having the formula

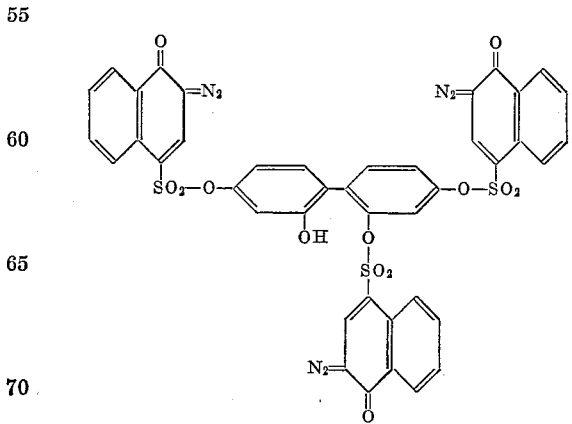

37. A presensitized printing plate comprising a base material having a coating thereon, the coating comprising a compound having the formula

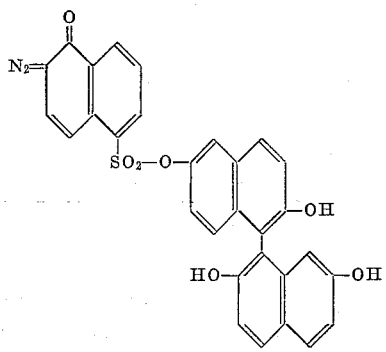

38. A presensitized printing plate comprising a base material having a coating thereon, the coating comprising a compound having the formula

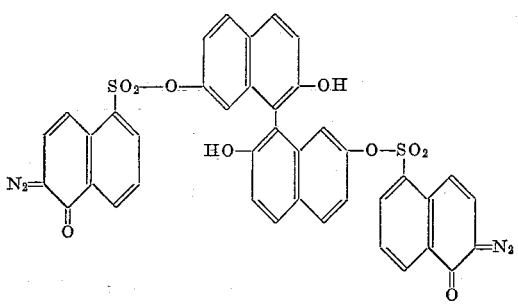

39. A process for making a printing plate which comprises exposing a coated base material to light under a master, the coating comprising a compound having the formula

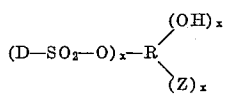

in which
D is a naphthoquinone-1,2-diazide group, and
R is selected from the group consisting of diphenyl, naphthyl, and dinaphthyl radicals, the substituent Z being selected from the group consisting of hydrogen, alkyl, alkoxy, carbalkoxy, halogen, and naphthoquinone-1,2-diazide sulfonyloxy groups, and
x represents an integer from 1 to 3, and treating the exposed coating with a developing solution.

40. A process for making a printing plate which comprises exposing a coated base material to light under a master, the coating comprising a compound having the formula

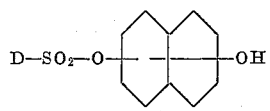

in which D is a naphthoquinone-1,2-diazide group, and treating the exposed coating with a developing solution.

41. A process for making a printing plate which comprises exposing a coated base material to light under a master, the coating comprising a compound having the formula

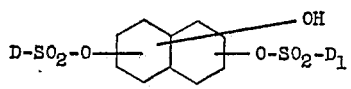

in which D and $D_1$ are naphthoquinone-1,2-diazide groups, and treating the exposed coating with a developing solution.

42. A process for making a printing plate which comprises exposing a coated base material to light under a master, the coating comprising a compound having the formula

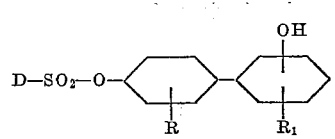

in which D is a naphthoquinone-1,2-diazide group, and R and $R_1$ are selected from the group consisting of hydrogen and hydroxyl, and treating the exposed coating with a developing solution.

43. A process for making a printing plate which comprises exposing a coated base material to light under a master, the coating comprising a compound having the formula

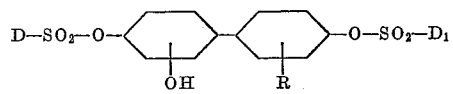

in which D and $D_1$ are naphthoquinone-1,2-diazide groups and R is selected from the group consisting of hydroxyl and naphthoquinone-1,2-diazide sulfonic acid ester groups, and treating the exposed coating with a developing solution.

44. A process for making a printing plate which comprises exposing a coated base material to light under a master, the coating comprising a compound having the formula

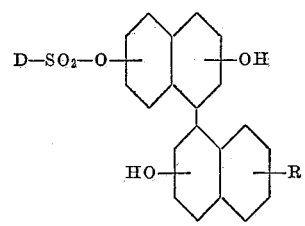

in which D is a naphthoquinone-1,2-diazide group and R is selected from the group consisting of hydroxyl and naphthoquinone-1,2-diazide sulfonic acid ester groups, and treating the exposed coating with a developing solution.

45. A process for making a printing plate which comprises exposing a coated base material to light under a master, the coating comprising a compound having the formula

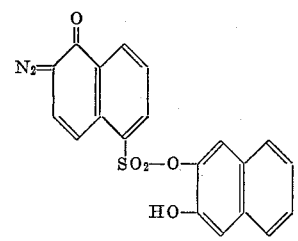

and treating the exposed coating with a developing solution.

46. A process for making a printing plate which comprises exposing a coated base material to light under a master, the coating comprising a compound having the formula

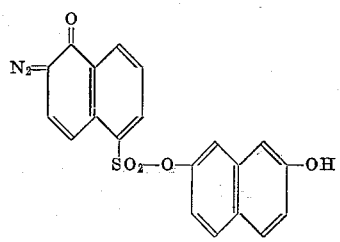

and treating the exposed coating with a developing solution.

47. A process for making a printing plate which comprises exposing a coated base material to light under a master, the coating comprising a compound having the formula

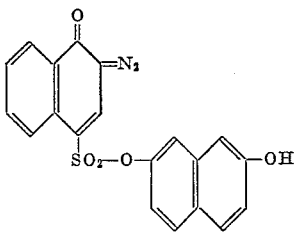

and treating the exposed coating with a developing solution.

48. A process for making a printing plate which comprises exposing a coated base material to light under a master, the coating comprising a compound having the formula

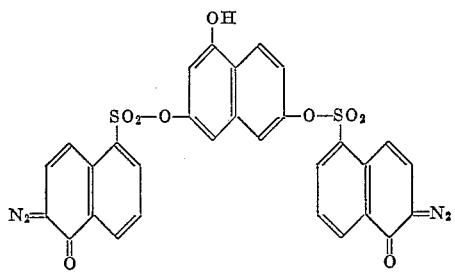

and treating the exposed coating with a developing solution.

49. A process for making a printing plate which comprises exposing a coated base material to light under a master, the coating comprising a compound having the formula

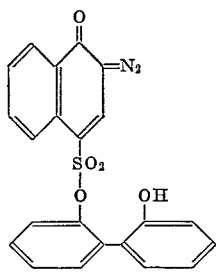

and treating the exposed coating with a developing solution.

50. A process for making a printing plate which comprises exposing a coated base material to light under a master, the coating comprising a compound having the formula

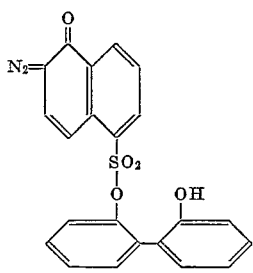

and treating the exposed coating with a developing solution.

51. A process for making a printing plate which comprises exposing a coated base material to light under a master, the coating comprising a compound having the formula

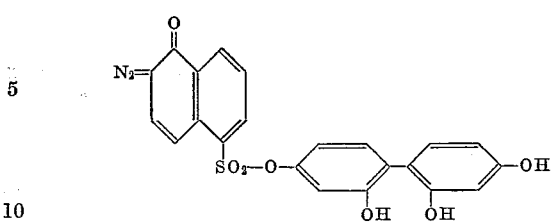

and treating the exposed coating with a developing solution.

52. A process for making a printing plate which comprises exposing a coated base material to light under a master, the coating comprising a compound having the formula

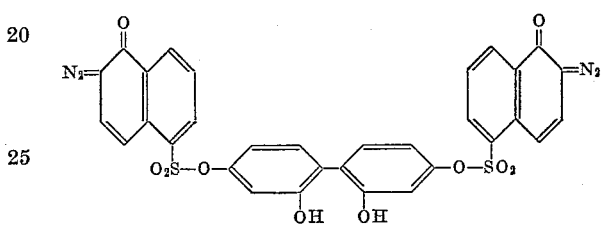

and treating the exposed coating with a developing solution.

53. A process for making a printing plate which comprises exposing a coated base material to light under a master, the coating comprising a compound having the formula

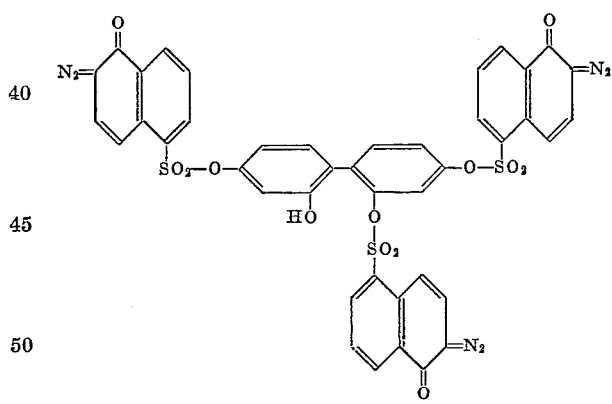

and treating the exposed coating with a developing solution.

54. A process for making a printing plate which comprises exposing a coated base material to light under a master, the coating comprising a compound having the formula

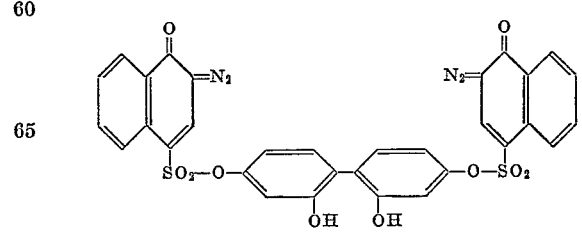

and treating the exposed coating with a developing solution.

55. A process for making a printing plate which comprises exposing a coated base material to light under a master, the coating comprising the formula

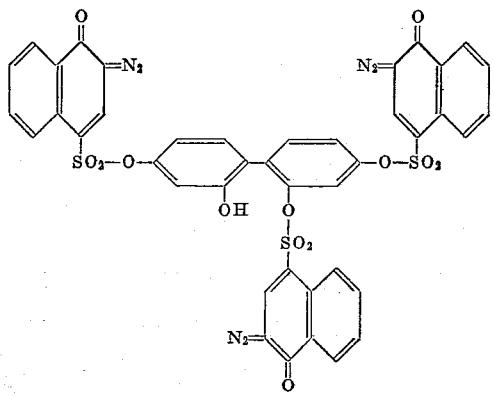

and treating the exposed coating with a developing solution.

56. A process for making a printing plate which comprises exposing a coated base material to light under a master, the coating comprising a compound having the formula

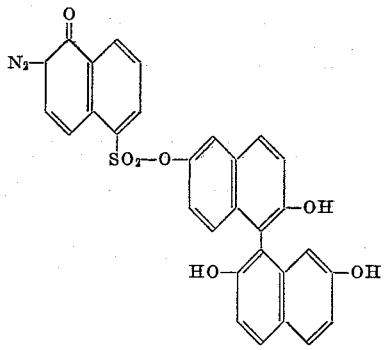

and treating the exposed coating with a developing solution.

57. A process for making a printing plate which comprises exposing a coated base material to light under a master, the coating comprising a compound having the formula

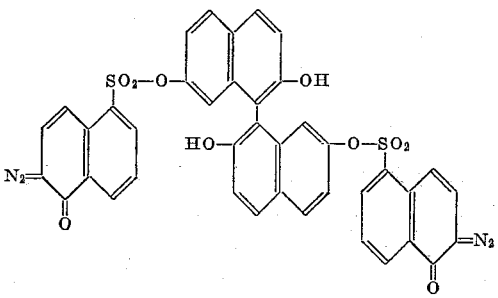

and treating the exposed coating with a developing solution.

References Cited in the file of this patent

UNITED STATES PATENTS

| | | |
|---|---|---|
| 2,289,804 | Peterson | July 14, 1942 |

FOREIGN PATENTS

| | | |
|---|---|---|
| 706,028 | Great Britain | Mar. 24, 1954 |
| 708,834 | Great Britain | May 12, 1954 |
| 737,379 | Great Britain | Sept. 28, 1955 |
| 732,544 | Great Britain | June 29, 1955 |
| 739,654 | Great Britain | Nov. 2, 1955 |